Sept. 30, 1947.  F. E. MUNSCHAUER  2,428,337
SLEEVE CLUTCH AND BRAKE
Filed Feb. 9, 1946
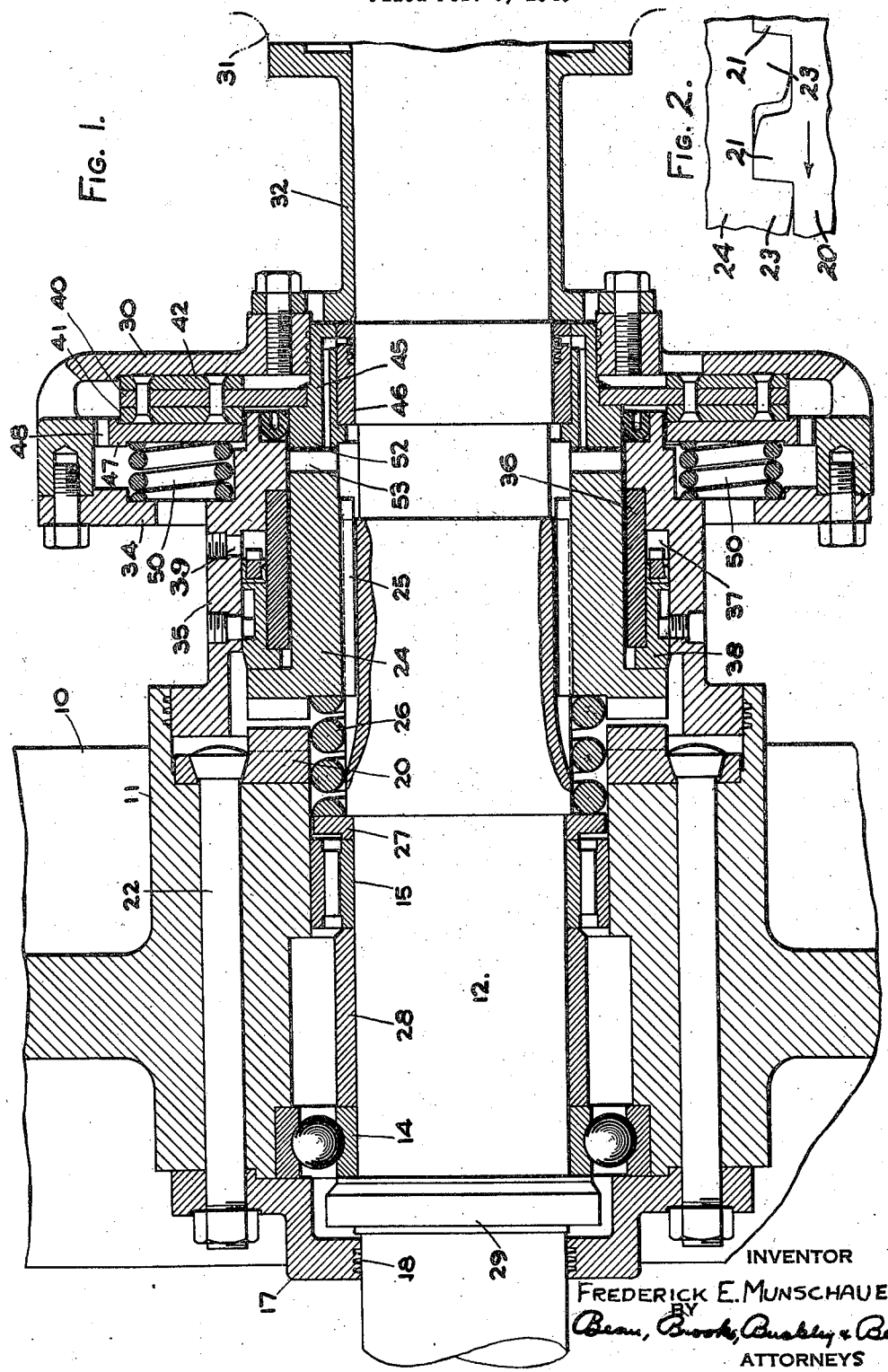
INVENTOR
FREDERICK E. MUNSCHAUER
BY
Bean, Brooks, Buckley & Bean
ATTORNEYS Patented Sept. 30, 1947

2,428,337

UNITED STATES PATENT OFFICE 2,428,337

SLEEVE CLUTCH AND BRAKE

Frederick E. Munschauer, Buffalo, N. Y., assignor to Niagara Machine and Tool Works, Buffalo, N. Y.

Application February 9, 1946, Serial No. 646,568

8 Claims. (Cl. 192—18)

This invention relates to drive control means for machinery and particularly to novel apparatus for transmitting accurately controlled intermittent driving impulses from a constantly rotating driving member.

The principles of the present invention are applicable to various kinds of machinery and such application is entirely within the purview of the present invention. However, to exemplify the principles of the invention, reference will be had in the following detailed description to presses for fabricating sheet metal and analogous material. The drive control means of the present invention is particularly advantageous when incorporated in power presses, power brakes and power shears. In such machines it is highly desirable to have drive control means which may be operated to start and stop the ultimate working parts of the machine quickly and at accurately determinable positions.

In the power press and shear art generally it has been found desirable and, in fact, essential to provide some kind of brake or drag or other detaining means for arresting movement of the working performing part of the machine when its driving connection is interrupted. In the prior art, this function has frequently been accomplished by providing a constantly applied brake, the normal running of the work performing part of the press being accomplished against the resistance of such brake.

According to the present invention combined clutch and brake means are provided wherein a single lineally movable operator serves automatically to engage clutch means and disengage brake means substantially simultaneously and vice versa. The construction proposed herein is such that the combined clutch and brake means and the power operating means therefor are compact and self-contained. Furthermore, the application of power from the driving to the driven member and the subsequent transmission of the power from the driven member to the brake are both effected by positively engaging clutch means.

The self-contained nature of the drive control and brake means is such that the working elements thereof may operate in a lubricant bath and this fact and the fact that the drive elements are substantially enclosed results in a far more silent operation than is otherwise possible in conventional machine control apparatus of this general class. Conventional mechanical power presses are usually provided with rigid type single-revolution clutches and their construction and operation are well known in this art. Partial strokes of the reciprocating slide of presses so equipped, such as are required in setting up and adjusting dies, can be accomplished only by manual movement of the press parts and not through employment of the usual driving motor. According to the present invention either partial movements or complete operating cycles of the press may be simply achieved by push-button controlled power operation and the stopping of the press, either in full cycle or partial cycle operation, is abrupt and accurate.

A single embodiment of the principles of the present invention is illustrated in the drawing and described in detail in the following specification, but it is to be understood that this embodiment is merely by way of example, and that the scope of the present invention is not limited otherwise than as defined in the appended claims.

In the drawing:

Fig. 1 is a longitudinal cross-sectional view through the form of the apparatus of the present invention which I have chosen to set forth by way of example; and Fig. 2 is an enlarged fragmentary side elevational view of the clutch elements proper showing the tooth formation.

In the drawing the numeral 10 designates a flywheel, gear or other driving wheel element having a hub 11. The numeral 12 designates a shaft, which is to be intermittently and selectively rotated by connection with the flywheel or other driving wheel 10, and which is to be abruptly arrested simultaneously with and upon disengagement of the shaft driving means. By way of illustration, the shaft 12 may comprise the crank shaft or eccentric shaft of a power press, power shear, or similar machine. In the alternative, shaft 12 may be an intermediate shaft having further driving connection with the ultimate driven shaft of the machine.

The flywheel 10 has antifriction bearing support upon shaft 12 as at 14 and 15. For purposes of lubricant retention, hub 11 is provided with a flanged element 17, which is provided with conventional shaft encircling fluid seal means 18.

The opposite side of hub 11 is counterbored to receive a jaw clutch element 20, and, in the illustrated instance, bolts 22 extend through clutch element 20, hub 11, and the flanged element 17 to maintain all three parts as a fixed integral assembly. A movable clutch element is designated 24 and has spline connection with shaft 12 as at 25, whereby clutch element 24 is fixed against rotation relative to shaft 12, but is movable axially therealong. A compression coil spring 26 encircles shaft 12 and bears at one end against a ring 27 which, in turn, presses against the inner race of bearing 15. The opposite end of spring 26 bears against the adjacent face of clutch element 24 to urge the latter to a position of disengagement with respect to clutch element 20. It will be seen that both ends of spring 26 act against portions of the mechanism which are always fixed relative to shaft 12, and that spring 26 will accordingly rotate with or remain stationary with shaft 12.

Fig. 2 illustrates the engaging portions of driving clutch element 20 and driven clutch element 24 in fragmentary elevation to show the preferred tooth profile. Referring to Fig. 2, driving and driven clutch elements 20 and 24, respectively, have interengaging teeth 21 and 23. It will be noted that the driving faces of teeth 21 and 23 are set at a slight angle to the driving axis. This introduces a force component of the driving torque which tends to force the elements 20 and 24 apart in an axial direction. This component is less than the force of friction between the driving faces of the teeth but is of sufficient magnitude to materially lessen the force required on the part of spring 26 to effect separation of the clutch elements, particularly under load, against the frictional resistance of the tooth faces and the spline connection 25. This in turn greatly decreases the burden placed upon piston 38 in overcoming the resistance of spring 26 in clutch-engaging operations.

It will be noted that a sleeve 28 surrounds shaft 12 and extends between the inner races of bearings 14 and 15. Because of the presence of sleeve 28 a nut 29 which engages threads on shaft 12 may be employed to clamp the entire assembly including the two inner races, sleeve 28 and ring 27 against the shaft shoulder which is engaged directly by ring 27.

The braking portion of the control mechanism comprises a support casing 30 which is fixed to the framework of the machine in any convenient manner. In the drawing, the dot-and-dash lines 31 indicate such framework schematically, and an intermediate sleeve 32 is flanged at its opposite ends and fixed respectively to the framework 31 and casing 30 to give rigid support to the latter.

The numeral 34 designates a cover element for casing 30 which is fixed marginally thereto and includes a hub portion 35. The hub portion 35 is counterbored and fitted with a sleeve element 36, which cooperates with the counterbore to form an annular recess or fluid pressure chamber 37, which is provided with an annular piston 38. A passage 39 leads to the annular recess 37 behind piston 38 and a suitable fluid pressure connection to passage 39 permits the introduction of fluid pressure into the chamber formed by the annular recess 37 and piston 38 and causes movement of piston 38 to the left as viewed in the drawing which brings about engagement of the jaws of clutch elements 20 and 24 against the resistance of spring 26.

Referring again to the mechanism of the brake support casing 30, a brake disc 40 having the usual friction brake facing 41 and 42 secured thereto is fixed to a hub element 45 which is supported concentrically upon shaft 12 through the intervention of an intermediate bushing 46 whereby the hub element 45 and shaft 12 are free to rotate relative to each other.

The brake facing 42 bears directly against the inner surface of casing 30 and the opposite brake facing 41 acts against an annular plate 47 which is free to move axially but has spline connection with casing 30 as at 48. A plurality of circumferentially spaced compression coil springs 50 act between cover element 34 and plate 47 to retain the brake facing surfaces in braking engagement with the inner wall of casing 30 and the adjacent face of plate 47. The brake disc 40 and its hub 45 are thus normally frictionally held against rotation. Hub 45 is provided with clutch jaws 52 which are normally in engagement with complementary clutch jaws 53 formed at the adjacent end of the axially movable driving clutch element 24.

In the position illustrated in the drawing, the driving clutch elements 20 and 24 are out of engagement and the clutch element 24 and shaft 12, by reason of engagement of the braking clutch 52, 53 are held against rotation by the brake mechanism. Flywheel 10 may continue to rotate freely on its antifriction bearings. By applying fluid pressure behind annular piston 38 the latter is moved to the left as viewed in the drawing and clutch elements 20 and 24 move into engagement. It will be noted that this movement is directly and automatically accompanied by separating movement of the clutch jaws 52, 53 and subsequent release of shaft 12 from its braked condition.

Upon the termination of an operating cycle or when the fluid pressure behind annular piston 38 is interrupted at any desired point or even accidentally, the spring 26 immediately moves clutch element 24 to the right as viewed in the drawing. It will be noted that the clutch jaws 52 and 53 come into engagement before the clutch elements 20 and 24 are entirely out of engagement. The braking action is thus momentarily overcome by the drive of the flywheel but the illustrated design insures immediate braking at the instant that the clutch elements 20 and 24 reach a point of disengagement.

While frequent reference is had herein to jaw clutches, it is to be understood that that term is intended to embrace any rigid positive type of clutch operating in an equivalent manner.

What is claimed is:

1. Drive control means for power presses, shears, and like machines comprising a drive shaft, a drive wheel and a brake element mounted for concentric rotation relative to said shaft, positive jaw clutch elements fixed to said drive wheel and said brake element, a jaw clutch element movable axially between said first two clutch elements for alternative clutching engagement therewith, an annular fluid pressure chamber disposed about said shaft between said drive wheel and said brake element, an annular piston in said chamber and engageable against said movable clutch element to selectively move the same to clutching engagement with said drive wheel clutch element upon application of fluid pressure, and a compression coil spring acting against said movable clutch element to move the same to clutching engagement with said brake element clutch element in the absence of fluid pressure in said annular chamber.

2. Drive control means for power presses, shears, and like machines comprising a drive shaft, a drive wheel and a brake element mounted for concentric rotation relative to said shaft, stationary means and frictionally engaging braking surfaces on said stationary means and on said rotatable braking element whereby the braking element is normally frictionally restrained against rotation, a clutch element movable axially between said drive wheel and said brake element for alternative clutching engagement therewith, an annular fluid pressure chamber disposed about said shaft between said drive wheel and said brake element, an annular piston in said chamber and engageable against said movable clutch element to selectively move the same to clutching engagement with said drive wheel upon application of fluid pressure, and a compression coil spring acting against said movable clutch element to move the same to clutching engagement with said brake element in the absence of fluid pressure in said annular chamber.

3. Drive control means for power presses, shears, and like machines comprising a drive shaft, a drive wheel and a brake element mounted for concentric rotation relative to said shaft, stationary means and frictionally engaging braking surfaces on said stationary means and on said rotatable braking element whereby the braking element is normally restrained against rotation, positive jaw clutch elements fixed to said drive wheel and said brake element, a jaw clutch element movable axially between said first two clutch elements for alternative clutching engagement therewith, an annular fluid pressure chamber disposed about said shaft between said drive wheel and said brake element, an annular piston in said chamber and engageable against said movable clutch element to selectively move the same to clutching engagement with said drive wheel clutch element upon application of fluid pressure, and a compression coil spring acting against said movable clutch element to move the same to clutching engagement with said brake element clutch element in the absence of fluid pressure in said annular chamber.

4. Drive control means for power presses, shears, and like machines comprising a drive shaft, a drive wheel and a brake element mounted for concentric rotation relative to said shaft, means normally restraining said brake element against rotation, positive jaw clutch elements fixed to said drive wheel and said brake element, a jaw clutch element movable axially between said first two clutch elements for alternative clutching engagement therewith, an annular fluid pressure chamber disposed about said shaft between said drive wheel and said brake element, an annular piston in said chamber and engageable against said movable clutch element to selectively move the same to clutching engagement with said drive wheel clutch element upon application of fluid pressure, and a compression coil spring acting against said movable clutch element to move the same to clutching engagement with said brake element clutch element in the absence of fluid pressure in said annular chamber.

5. Drive control means for power presses, shears, and like machines comprising a drive shaft, a normally rotating drive wheel having bearing on said drive shaft, a jaw clutch element fixed to said drive wheel, an axially slidable jaw clutch element keyed to said drive shaft, a compression coil spring acting against said axially slidable jaw clutch element to normally hold the latter out of engagement with the fixed jaw clutch element, a stationary brake element and a brake element mounted for free rotation concentrically with respect to said drive shaft, said brake elements being normally in frictional braking engagement, a jaw clutch element fixed to said rotatable braking element and engageable with said slidable jaw clutch element by and upon movement of the latter from engagement with said fixed drive wheel jaw clutch element.

6. Drive control means for power presses, shears, and like machines comprising a drive shaft, a normally rotating drive wheel having bearing on said drive shaft, clutch means associated with said drive wheel, an axially slidable clutch element rotatable with said drive shaft, a compression coil spring acting against said axially slidable clutch element to normally hold the latter out of engagement with the drive shaft clutch means, a stationary brake element and a brake element mounted for free rotation concentrically with respect to said drive shaft, said brake elements being normally in frictional braking engagement, clutch means associated with said rotatable braking element and engageable with said slidable clutch element by and upon movement of the latter from engagement with said drive wheel clutch means.

7. Drive control means for power presses, shears, and like machines comprising a drive shaft, a normally rotating drive wheel having bearing on said drive shaft, a jaw clutch element fixed to said drive wheel, an axially slidable jaw clutch element keyed to said drive shaft, a compression coil spring acting against said axially slidable jaw clutch element to normally hold the latter out of engagement with the fixed jaw clutch element, a brake element mounted for free rotation concentrically with respect to said drive shaft, means normally restraining said brake element against rotation, a jaw clutch element fixed to said rotatable braking element and engageable with said slidable jaw clutch element by and upon movement of the latter from engagement with said fixed drive wheel jaw clutch element.

8. Drive control means for power presses, shears, and like machines comprising a drive shaft, a normally rotating drive wheel having bearing on said drive shaft, clutch means associated with said drive wheel, an axially slidable clutch element rotatable with said drive shaft, a compression coil spring acting against said axially slidable clutch element to normally hold the latter out of engagement with the drive shaft clutch means, a brake element mounted for free rotation concentrically with respect to said drive shaft, means normally restraining said brake element against rotation, clutch means associated with said rotatable braking element and engageable with said slidable clutch element by and upon movement of the latter from engagement with said drive wheel clutch means.

FREDERICK E. MUNSCHAUER.

REFERENCES CITED

The following references are of record in the file of this patent:

UNITED STATES PATENTS

| Number | Name | Date |
| --- | --- | --- |
| 2,159,326 | Harwood et al. | May 23, 1939 |